(12) United States Patent
Obata et al.

(10) Patent No.: US 6,839,900 B2
(45) Date of Patent: Jan. 4, 2005

(54) DISK CARTRIDGE, A METHOD OF MANUFACTURING SAME, AND A RECORDING/REPRODUCING SYSTEM

(75) Inventors: Manabu Obata, Kanagawa (JP); Mitsunori Matsumura, Tokyo (JP)

(73) Assignee: Sony Corporation, Tokyo (JP)

(*) Notice: Subject to any disclaimer, the term of this patent is extended or adjusted under 35 U.S.C. 154(b) by 720 days.

(21) Appl. No.: 09/931,707

(22) Filed: Aug. 16, 2001

(65) Prior Publication Data

US 2002/0021639 A1 Feb. 21, 2002

(30) Foreign Application Priority Data

Aug. 18, 2000 (JP) .................................. P2000-248952

(51) Int. Cl.[7] .............................. G11B 7/00; G11B 7/24; G11B 17/00
(52) U.S. Cl. ...................... 720/729; 360/133; 369/52.1; 369/275.3
(58) Field of Search .......................... 369/30.03, 30.04, 369/52.1, 272, 282, 290, 291; 360/133, 244.1, 245.8, 729; 720/729, 725, 728

(56) References Cited

U.S. PATENT DOCUMENTS

| | | | |
|---|---|---|---|
| 4,329,575 A | 5/1982 | Roach | |
| 5,119,363 A | 6/1992 | Satoh et al. | |
| 5,398,231 A | 3/1995 | Shin et al. | |
| 5,537,387 A | 7/1996 | Ando et al. | |
| 5,577,914 A | * 11/1996 | Takahashi et al. | 434/113 |
| 5,734,630 A | 3/1998 | Nishigori et al. | |
| 6,088,182 A | 7/2000 | Taki et al. | |
| 6,452,874 B1 | 9/2002 | Otsuka et al. | |
| 6,490,242 B1 | * 12/2002 | Bonn et al. | 720/738 |
| 6,560,070 B2 | * 5/2003 | Takino | 360/133 |

FOREIGN PATENT DOCUMENTS

| | | |
|---|---|---|
| EP | 0 867 881 | 9/1998 |
| JP | 60 193143 | 10/1985 |
| JP | 2000 010876 | 1/2000 |
| WO | WO 93 00680 | 1/1993 |

* cited by examiner

Primary Examiner—Thang V. Tran
Assistant Examiner—Bach Q Vuong
(74) Attorney, Agent, or Firm—Frommer Lawrence & Haug LLP; William S. Frommer

(57) ABSTRACT

A disk cartridge which allows for the user to know what contents are recorded in which disk cartridge without the need of reproducing the disk cartridge, a method of manufacturing the same and a recording/reproducing system using the same have been provided, in which the disk cartridge is accomplished by incorporating the optical disk in a case, a recording surface of the optical disk is comprised of an annular inner area, a clamping area, a transition area, an information recording area and a rim area, which are arranged from inside to outside in radial directions of the optical disk, and disk cartridge identification information is recorded in the transition area of the optical disk, and also the disk cartridge identification information recorded in the optical disk is provided discernibly from outside the case.

46 Claims, 10 Drawing Sheets

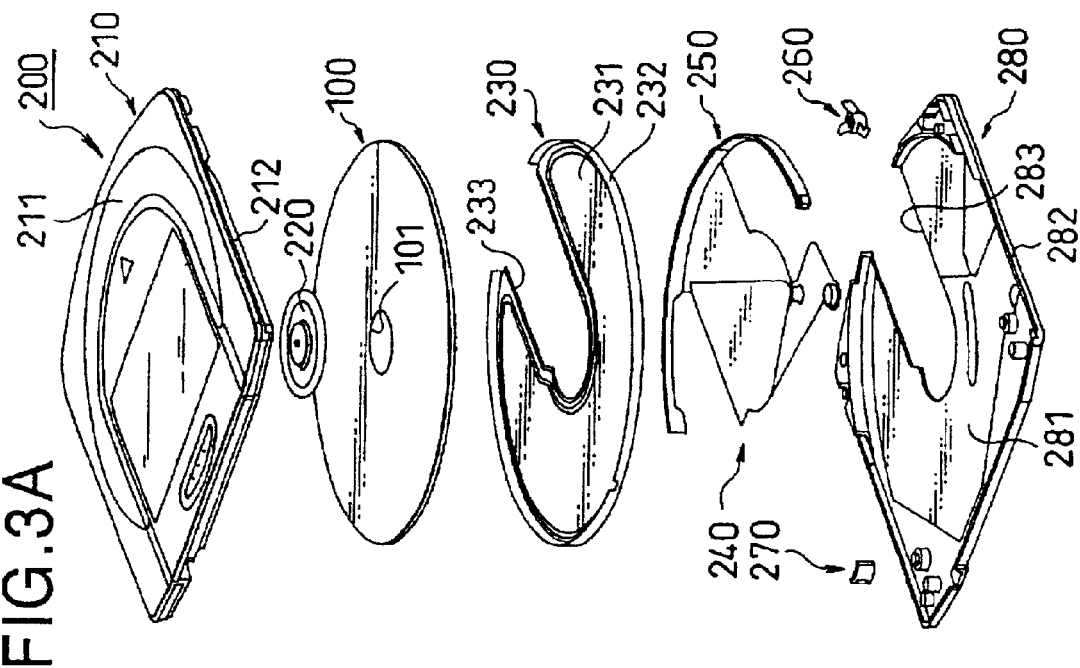
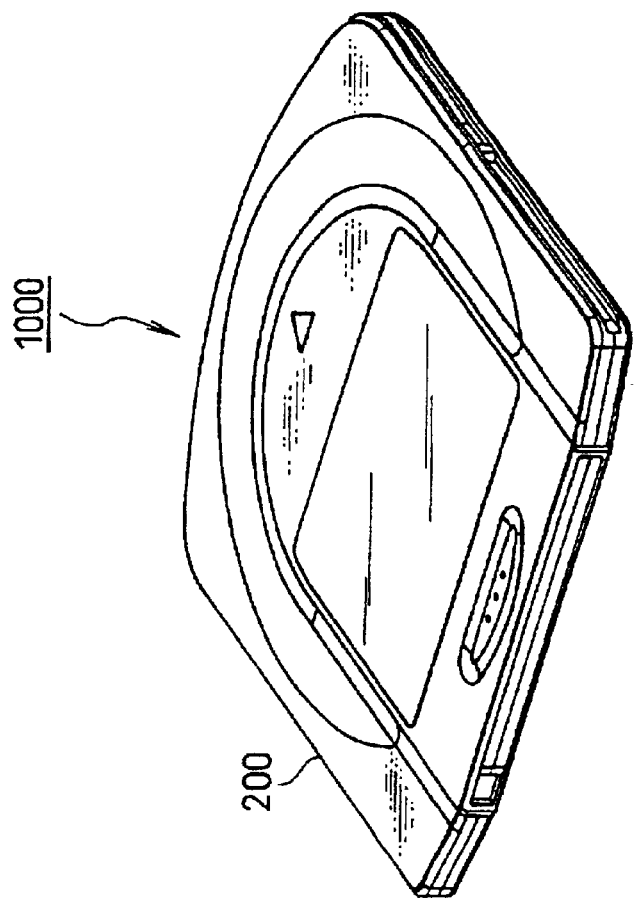

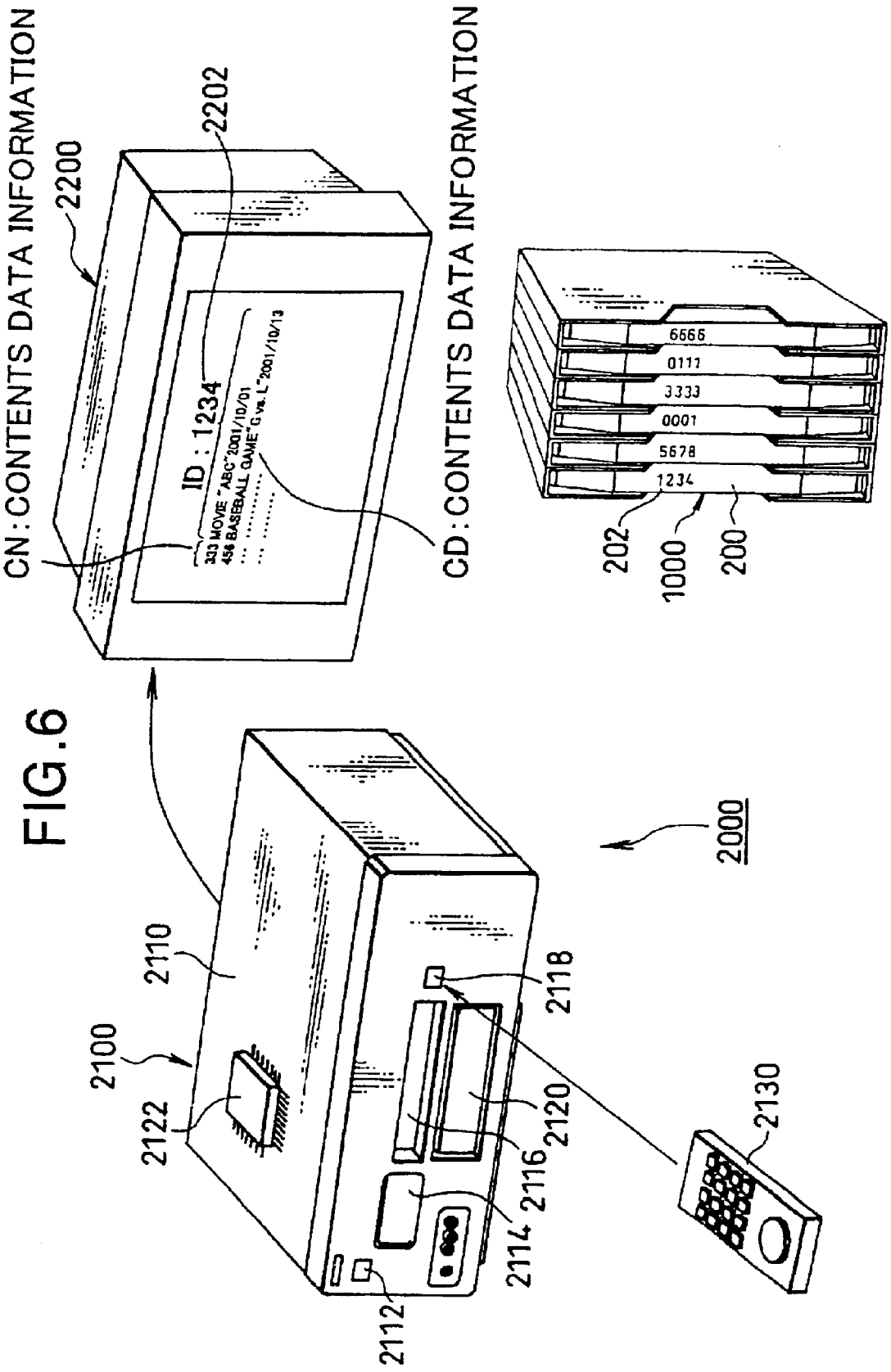

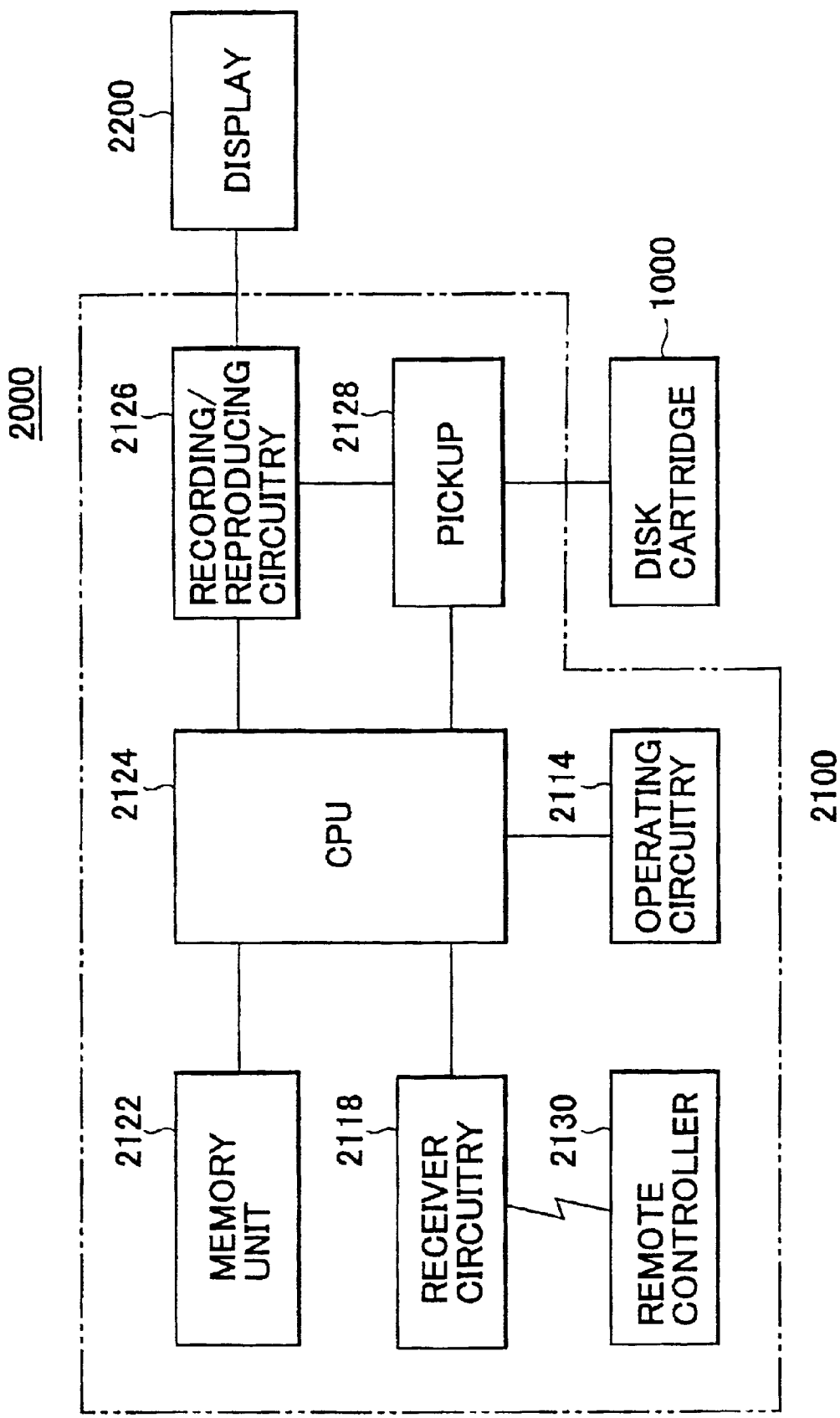

FIG.8

| CARTRIDGE ID | CONTENTS CN | CONTENTS DATA INFOR. CD |
|---|---|---|
| ID1 | CN1 | CD1 |
| | CN2 | CD2 |
| | CN3 | CN3 |
| | CN4 | CN4 |
| ID2 | CN5 | CN5 |
| | CN6 | CN6 |
| | CN7 | CN7 |
| | CN8 | CD8 |
| ID3 | CN9 | CN9 |
| | CN10 | CN10 |
| | CN11 | CN11 |
| | CN12 | CN12 |

FIG.9

| RECORDED CONTENTS | | CONTENTS DATA | | |
|---|---|---|---|---|
| | | CONTENTS IDs | SETUP DATA | ADDED INFORMATION |
| BROADCAST CONTENTS | BS DIGITAL, WITH EPG | ○ (WITH) | ○ (WITH) | × (WITH OUT) |
| | ANALOG GROUND-WAVE, WITHOUT PROGRAM DATA | × (WITH OUT) ※ | × (WITH OUT) | × (WITH OUT) |
| COPY OF COMMERCIAL SOFTWARE | WITH ID CONTROL (WITH COPYRIGHT) | ○ (WITH) | ○ (WITH) | × (WITH OUT) |
| | WITHOUT ID CONTROL (VIDEO TAPES) | × (WITH OUT) ※ | × (WITH OUT) | × (WITH OUT) |
| RECORDED CONTENTS SUCH AS DVs | | × (WITH OUT) ※ | × (WITH OUT) | × (WITH OUT) |
| EDITED CONTENTS | | × (WITH OUT) ※ | × (WITH OUT) | × (WITH OUT) |

※ AUTOMATICALLY ADDED

DISK CARTRIDGE, A METHOD OF MANUFACTURING SAME, AND A RECORDING/REPRODUCING SYSTEM

CROSS REFERENCE TO RELATED APPLICATIONS

The present document is based on Japanese Priority Document JP 2000-248952, filed in the Japanese Patent Office on Aug. 18, 2000, the entire contents of which being incorporated by reference.

BACKGROUND OF THE INVENTION

1. Field of the Invention

The present invention relates to a disk cartridge capable of recording and reproducing contents of information, a method of manufacturing the same, and to a recording/reproducing system for recording and reproducing the contents of information to and from such a disk cartridge.

2. Description of the Related Art

Recently, it is being realized to record and/or reproduce contents of TV programs to and from a disk cartridge typically represented by a DVD-RAM having therein a large capacity disk such as an optical disk, a magneto-optical disk and the like.

SUMMARY OF THE INVENTION

This type of a large capacity disk cartridge can record substantially a large quantity of contents of information. Therefore, there has been involved such a problem when trying to find out which disk cartridge stores what contents that it has been necessary to insert disk cartridges one by one into a recording/reproducing apparatus and playback, which has been very troublesome.

Therefore, there has been needed to provide a novel disk cartridge, a method of manufacture the same, and a recording/reproducing system, which enables for the user readily to know which disk cartridge stores what contents without the need of reproducing every disk cartridges one by one.

In order to solve the above-mentioned problem associated with the conventional art, a disk cartridge provided according to one aspect of the present invention is comprised of a disk and a case for housing this disk. The disk has: a center hole provided in the center thereof; a disk holding annular area which extends in radial directions from the above-mentioned center hole; a transition area which extends annularly and outwardly from the disk holding area, and which is not used for recording information; and an information recording area for recording information which is formed extending annularly and radially outside the above-mentioned transition area. The above-mentioned information recording area comprises: a first annular zone which is placed internally in radial directions of the disk, and in which information is recorded unrewritably; and a second annular zone which is placed outward in the radial directions from the first annular zone, and in which information is recorded rewritably. An annular portion including the above-mentioned transition area and the above-mentioned first annular zone is defined as a third annular zone so that a disk cartridge identification information assigned uniquely to this disk is recorded in a portion of this third annular zone, and also this disk cartridge identification information is indicated discernibly from outside the case.

Thereby, because the disk cartridge identification information assigned uniquely to a respective disk is recorded in the third annular zone of the disk, if a contents identification information for identifying the contents and its contents index (descriptive) information descriptive of the contents are allowed to be recorded at the same time when recording the contents in the disk, these contents identification information and contents index (descriptive) information can be recorded as correlated with the disk cartridge identification information by means of a recording/reproducing apparatus for use of the disk cartridge.

Further, a method of manufacturing the disk cartridge according to the invention is directed to a method of manufacturing the disk cartridge which is comprised of a disk on which an information recording area is formed for recording information, and a case for housing this disk. The method comprises the steps of forming: a disk holder area which extends annularly and radially from the center hole provided in the center of the disk; a transition area which extends annularly and radially from the disk holder area, and which is not used for recording information; and an information recording area which extends annularly and radially from the transition area. The method further includes: a first step for forming a first annular zone and a second annular zone in the information recording region, the first annular zone being positioned internally in the radial directions of the information recording area for recording information unrewritably, the second annular zone being positioned outwardly in the radial directions thereof for recording information rewritably; a second step of assembling the disk manufactured in the above first step into a case; a third step of recording the disk cartridge identification information which was assigned uniquely to each disk into a third annular zone which is defined to include the transition area and the first annular zone; and a fourth step of indicating the above-mentioned disk cartridge identification information visibly from outside the case.

Further, a recording/reproducing system according to an aspect of the present invention is comprised of a disk cartridge and a recording/reproducing apparatus. The disk cartridge has a disk to and from which information can be recorded and reproduced, and a case for accommodating the disk, wherein the disk is allowed to record the disk cartridge identification information which is assigned uniquely to this disk, and this disk cartridge identification information is also indicated on the case discernibly from the outside. Further, the recording/reproducing apparatus is comprised of: a recording device for recording program contents, a contents identification information assigned uniquely to each piece of the contents, and a contents index information descriptive of the contents onto the disk in the disk cartridge loaded in the recording/reproducing apparatus; a reproducing device for reproducing the disk cartridge identification information, the contents, the contents identification information and the contents index information which are recorded in the disk; a memory device for storing the disk cartridge identification information, the contents identification information and the contents index information, which are reproduced by the reproducing device, in association therebetween; and a search device for searching information from the disk cartridge identification information, the contents identification information and the contents index information which are recorded in the memory device.

Thereby, in the memory device in the recording/reproducing apparatus, the contents identification information and the contents index information are stored in association with the disk cartridge identification information which was uniquely assigned to the disk in the disk cartridge which was loaded in the recording/reproducing apparatus.

Therefore, it is enabled using the search device to retrieve the contents identification information and/or the contents index information in the memory device in accordance with the disk cartridge identification information which is provided visibly from outside the case of the disk cartridge, or to search for the disk cartridge identification information which is provided visibly from outside the case in accordance with the contents index information.

As described hereinabove, according to the disk cartridge and the method of manufacturing the same, there have been accomplished such advantages that because the disk cartridge identification information assigned uniquely to each disk is recorded in the third annular zone of the disk, if the contents identification information for identifying the contents and the contents index information descriptive of the contents are allowed to be recorded in the disk when recording the contents of the program in the disk, it is enabled to store these contents identification information and the contents index information in association with the disk cartridge identification information using the recording/reproducing apparatus for this disk cartridge.

Therefore, it becomes possible advantageously to retrieve the contents identification information and the contents index information in accordance with the disk cartridge identification information which is provided discernible from outside the case, or alternatively to search for the disk cartridge identification information which is discernible from outside the case in accordance with the contents index information, thereby enabling to know what contents of program is recorded in which disk cartridge easily without the need of reproducing all of the contents recorded in the disk cartridge.

Furthermore, according to the recording/reproducing system of the present invention, the contents identification information and the contents index (descriptive) information are recorded with correlation to the disk cartridge identification information in the memory of the recording/reproducing apparatus. Therefore, it becomes possible advantageously to retrieve the contents identification information and the contents index information stored in the memory on the basis of the disk cartridge identification information provided recognizably from outside the case of the disk cartridge, or to find the disk cartridge identification information which is provided to be recognizable from outside the case in accordance with the contents index information.

Therefore, it is allowed to know readily what contents are recorded in which disk cartridge without the need of reproducing the contents in the disk cartridge.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIGS. 3A–3B show a construction of the disk cartridge according to the present invention, in which FIG. 3A shows an exploded perspective view thereof, and FIG. 3B shows an assembled state thereof;

FIG. 6 shows an entire arrangement of a recording/reproducing system according to the present invention;

FIG. 7 is a schematic block diagram indicating a system configuration of the recording/reproducing system according to the present invention;

FIG. 8 shows record contents stored in a memory in a recording/reproducing apparatus of the recording/reproducing system according to the present invention;

FIG. 9 explains added information recorded in broadcast contents, commercial software, and recorded video cassettes; and FIGS. 10A–10C illustrate examples of recording on the disk cartridge of a disk cartridge ID information, in which FIG. 10A shows an example of using a seal, FIG. 10B shows an example of using a bar code label, and FIG. 10C shows an example of using a memory for recording.

PREFERRED EMBODIMENT OF THE INVENTION

Figure 1:
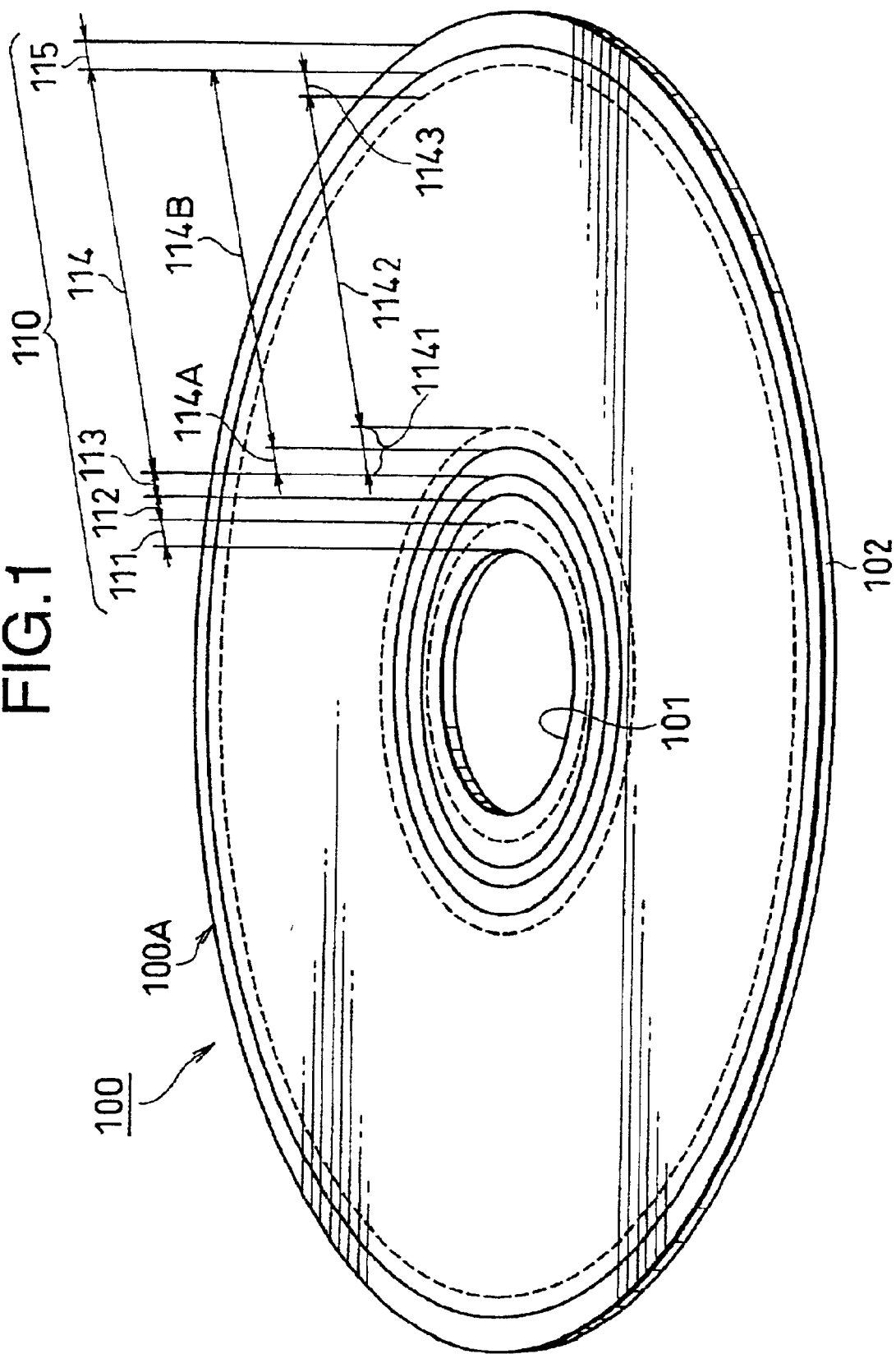
FIG. 1 is a perspective view of an optical disk, which constitutes a disk cartridge according to an embodiment of the present invention.

Preferred embodiments of the present invention will be described with reference to the accompanying drawings in the following.

Disk Cartridge

With reference to FIGS. 3A–3B, a constitution of a disk cartridge according to the present invention is illustrated, in which FIG. 3A shows an exploded perspective view, and FIG. 3B shows an assembled perspective view thereof.

The disk cartridge is comprised of a disk and a case which accommodates this disk.

The case 200 is comprised of an upper shell 210, a chuck plate 220, an intermediate shell 230, a first rotary shutter 240, a second rotary shutter 250, a shutter lock tab (lock lever) 260, a recording inhibition tab (safety tab) 270, and a lower shell 280.

The upper shell 210 and the lower shell 280 are fit in firmly. In a space between the upper shell 210 and the lower shell 280, there are provided, sequentially from the above, the chuck plate 220, the optical disk 100, the intermediate shell 230, the first rotary shutter 240 and the second rotary shutter 250.

The upper shell 210 has an upper body plate 211 which is approximately of a rectangular form, and an upper side wall portion 212 which is provided projecting from a peripheral rim of the upper body plate 211.

The lower shell 280 has a lower body plate 281 which is approximately of a rectangular form, and a lower side wall portion 282 which is provided projecting from a peripheral rim of the lower body plate 281. In the lower shell 280, there is provided a lower opening 283 which extends from a center of the lower body plate 281 thereof toward the lower sidewall portion 282.

These upper shell 210 and lower shell 280 are fit into each other at their side wall portions 212, 282 thereby forming the above-mentioned inner space for accommodation of the disk.

The chuck plate 220 is arranged to be magnetically chucked to a magnet incorporated in a spindle motor (not shown).

When a disk cartridge 1000 is loaded into the recording/reproducing apparatus, the optical disk 100 is rotated by a rotary drive mechanism of the recording/reproducing apparatus via the chuck plate 220.

The intermediate shell 230 which is firmly fixed on the upper shell 210 is comprised of a disk portion 231 which is slightly larger than a periphery of the optical disk 100, and a side wall portion 232 erecting from a circumference thereof. In the intermediate shell 230, there is provided an opening 233 which extends from the center of the disk portion 231 toward the side wall portion 232, approximately in coincidence with the opening 283 of the lower shell 280. The optical disk 100 is accommodated within an enclosure formed by the disk portion 231 of the intermediate shell 230 and its side wall portion 232 so as to prevent intrusion of dust.

The first and the second rotary shutters 240, 250 are supported pivotally in a space between the intermediate shell 230 and the lower shell 280, and are driven to open and close the lower opening 283 of the lower shell 280 and the opening 233 of the intermediate shell 230.

The first and the second rotary shutters 240, 250 secure for the opening 283 in the lower shell 280 and the lower opening 233 in the intermediate shell 230 to be closed always when the disk cartridge 1000 is not loaded in the recording/reproducing apparatus, and to be opened when the disk cartridge 1000 is inserted into the recording/reproducing apparatus by means of its drive mechanism.

The shutter lock tab 260 which is pivotally supported on the lower shell 280 ensures both the first rotary shutter 240 and the second rotary shutter 250 which are engaged in a close state to be locked and not to be released. When the disk cartridge 1000 is loaded into the recording/reproducing apparatus, the shutter lock tab 260 is driven by the mechanism of the recording/reproducing apparatus to release the locked state of the first and the second rotary shutters 240, 250, and to be opened.

The recording inhibition tab 270 is provided slidably on an outer surface of the sidewall either of the upper shell or the lower shell 210, 280. By slide action of this recording inhibition tab 270, a recording operation on the optical disk 100 in the recording/reproducing apparatus can be allowed or inhibited.

According to the arrangement described above, when the first and the second shutters 240, 250 are driven to open the openings 283, 233, a recording surface 110 of the optical disk 100 is exposed to the outside, and when they are driven to shut the openings 283, 233, the recording surface 110 of the optical disk 100 is closed to the outside.

Optical Disk

Now, the optical disk according to the invention will be described in the following.

Figure 2:
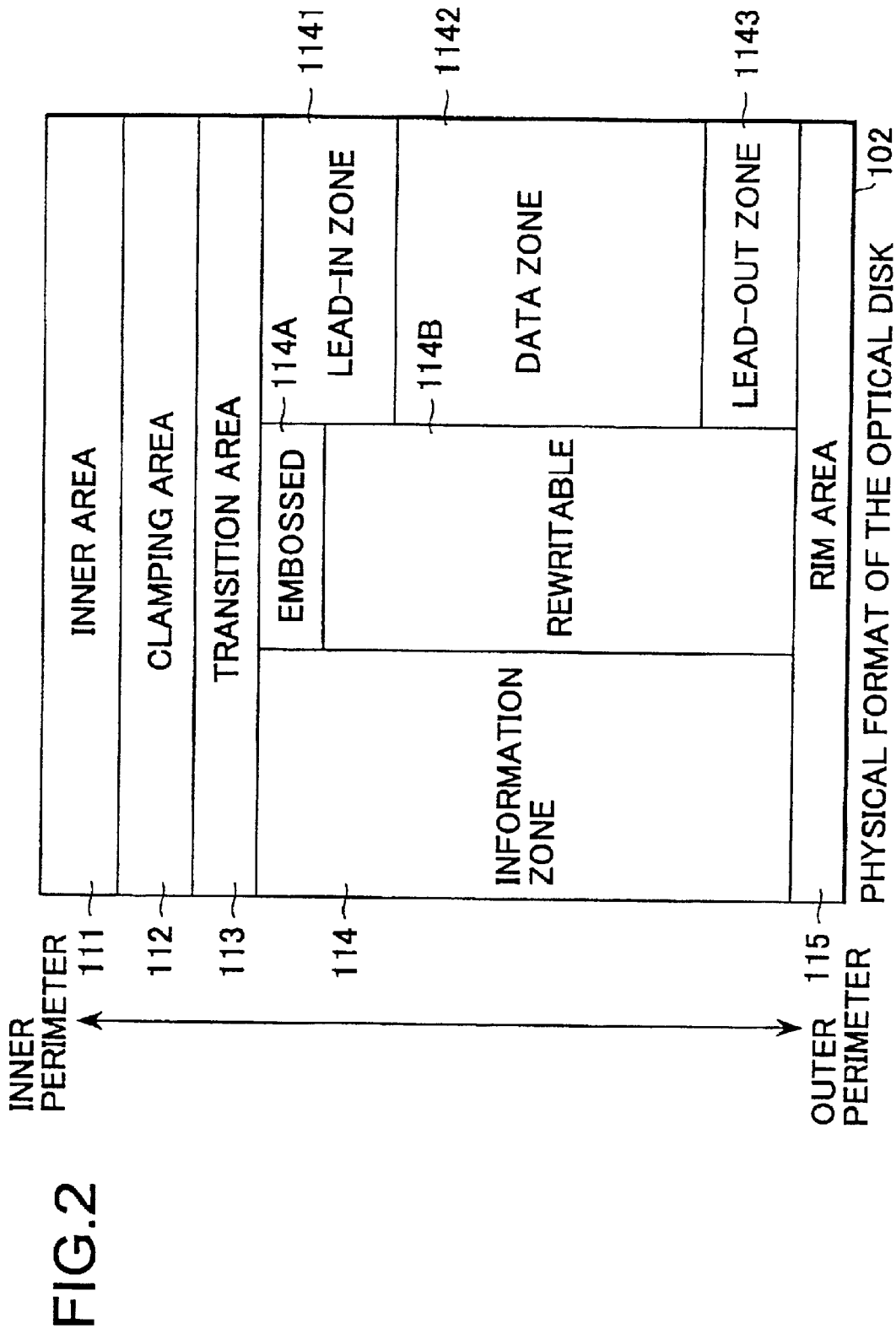
FIG. 2 is a diagram illustrating a physical format of the optical disk constituting the disk cartridge of the present invention.

FIG. 1 is a perspective view indicating a structure of the optical disk that constitutes the disk cartridge according to one embodiment of the invention. FIG. 2 is a schematic diagram indicating a physical format of the optical disk that constitutes the disk cartridge according to the present invention.

As illustrated in FIGS. 1 and 2, the optical disk 100 has a circular disc substrate body 100A, and a center hole 101 is formed in the center of the substrate body 100A.

On one surface of the substrate body 100A, an annular recording surface is formed. This recording surface has an inner area 111 formed in an annular shape, a clamping area 112 being a disk holder area of the disk in the disk cartridge of the present invention, a transition area 113, an information recording area 114, and a rim area 115, which are arranged sequentially in radial directions from the inner side thereof to the outer periphery thereof.

The inner area 111 and the clamping area 112 are portions where the chuck plate 220 is attached. Here, the preferred embodiment of the invention is described by way of an example in which both the inner area 111 and the clamping area 112 are held by the chuck plate 220. Thereby, the disk holder area is described as the clamping area 112. However, it is not limited thereto, and the disk may be retained by any other means than the chuck plate 220 to the same effect.

The transition area 113 which is formed between the clamping area 112 and the information recording area 114 is a portion where no information is recorded. The rim area 115 which is formed between the information recording area 114 and an outer periphery portion 102 of the optical disk 100 is a portion where no information is recorded.

The information recording area 114 includes an embossed zone 114A being a first annular zone of the disk in the disk cartridge of the present invention, which is formed internally in radial directions of the optical disk 100, and a rewritable zone 114B being a second annular zone of the disk in the disk cartridge of the present invention, which is formed externally in the radial directions thereof. Both the transition area 113 and the embossed zone 114A correspond to a third annular area claimed in the scope of the invention.

The embossed zone 114A is an area where information is recorded unrewritably. Recording of information on the embossed zone 114A is done by a step of forming concave pits. This step of forming the pits is executed concurrently with mold processing of FIGS. 4A and 4B, which will be described later.

Because information is recorded in this embossed zone 114A as a concave pit pattern, it is not possible to rewrite this information.

The rewritable zone 114B for recording information rewritably includes pits which are formed by molding, for indicating address information within the optical disk 100. Recording of information onto the rewritable zone 114B is carried out by forming a pit pattern having a groove and a land of a crystalline state and an amorphous state in its recording film using an optical beam which is irradiated from a pickup of the apparatus.

The information recording area 114 includes the above-mentioned embossed zone 114A and the rewritable zone 114B. A format of the information recording area 114, however, as shown in FIGS. 1 and 2 is partitioned, from the inner perimeter thereof, into a lead-in zone 1141, a data zone 1142, and a lead-out zone 1143, respectively.

The lead-in zone 1141 includes an entire portion of the embossed zone 114A and a part of the rewritable zone 114B which is adjacent to the embossed zone 114A.

This lead-in zone 1141 is allowed to record general information on the disk (such as a revolving speed, a type of disk, a tracking information and the like), a laser power calibration, defect management information and the like as its lead-in information.

The lead-out zone 1143 is comprised of a part of the information recording area 114 close to the periphery of the disk, and is allowed to record as its lead-out information a defect management information and the like.

The data zone 1142 which is a zone sandwiched between the lead-in zone 1141 and the lead-out zone 1143 in the information recording area 114, and is an area where information is recorded rewritably.

By way of example, the above-mentioned optical disk 100 according to the present invention is a phase-change type optical disk capable of overwriting (or rewriting) information. This phase-change type optical disk allows its recording film to change reversibly between a crystalline state and an amorphous state whereby a reflectance of the recording film changes in the crystalline state and in the amorphous state. Utilizing this change of reflectance, information is recorded and reproduced.

Manufacture of the Optical Disk

Now, with reference to FIGS. 4A–4E, a process of manufacturing the optical disk as a first step of the disk cartridge manufacturing method of the present invention will be described in the following.

Figure 4A:
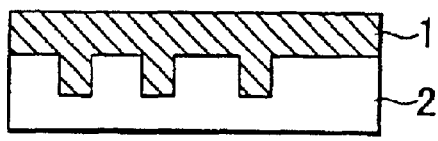
FIG. 4 shows a process flow for producing a disk according to the present invention.
Figure 4B:
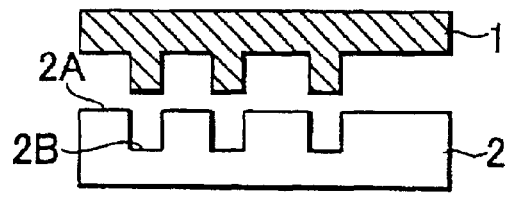

A polycarbonate (PC) substrate 2 (which corresponds to the substrate 100 in FIG. 1) is injection-molded after charging a molten polycarbonate into a die provided with a stamper 1 as shown in FIGS. 4A–4B. Thereby, a land 2A and a groove 2B are formed in the PC substrate 2. The stamper 1 is provided with a convex portion for forming pits in the embossed zone 114A and in the rewritable zone 114B. By this injection molding, these pits are formed.

Figure 4C:
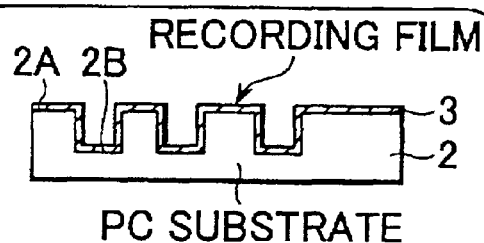
Figure 4D:
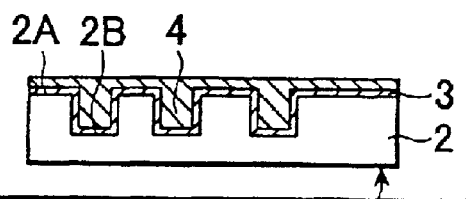
Figure 4E:
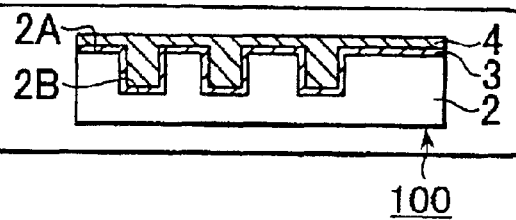

Then, a recording film 3 capable of recording information by the phase change is formed on the PC substrate 2 as shown in FIG. 4C, and a protection film 3 is formed on the recording film 3. In the next step of FIG. 4E, an initialization processing of the recording film 3 is executed by a laser beam irradiation or heating, thereby accomplishing manufacture of the optical disk 100 having the annular inner area 111, the clamping area 112, the transition area 113, the information recording area 114 and the rim area 115.

Disk Cartridge and Its Features

A disk cartridge 1000 is accomplished by incorporating the optical disk 100 manufactured as above into a case 200. According to a feature of the present invention, a disk cartridge identification (ID) information assigned uniquely to each optical disk 100 is recorded in its optical disk, and further the disk cartridge identification information recorded in the optical disk 100 is indicated on the case 200 which accommodates this optical disk 100 so as to be visibly discernible from outside thereof. This feature of the invention will be described more specifically in the following.

The disk cartridge identification information which is information to be assigned uniquely to each optical disk 100 may be generated sequentially, for example, as a serial number, or a randomly occurring number so long as it can differentiate from another optical disk.

Further, the disk cartridge identification information may be composed of a combination of characters including alphabetical and numerical letters.

Recording of the Disk Cartridge ID Information

Now, with reference to FIG. 1, recording of the disk cartridge identification information onto the optical disk 100 will be described in the following.

Because the disk cartridge identification information is a data specifically assigned to each optical disk 100, it is necessary to record this disk cartridge identification information in the optical disk 100 in a form easily to be read by a pickup of the recording/reproducing apparatus whenever this optical disk is loaded into a recording/reproducing apparatus for performing recording/reproducing operation to the disk cartridge 1000.

Further, in the information recording area 114 there is set up the embossed zone 114A for recording information unrewritably. In order to form pits in this embossed zone 114A, a respective stamper different for each disk is needed. However, provision of each stamper for each optical disk is not practical.

Therefore, it is necessary to record the disk cartridge identification information in a form different from the form for recording information in the information recording area 114.

Thereby, according to the present invention, the transition area 113 and the embossed area 114A being the first annular zone of the disk of the present invention are defined to be used as a zone corresponding to a third annular zone of the disk, for recording the disk cartridge identification information.

The disk cartridge identification information is recorded by forming a plurality of rectangular patterns each having its length in a radial direction of the optical disk and its width in perimeter directions thereof, and spaced apart from each other in the perimeter directions. More specifically, the disk cartridge identification information is expressed by a combination of compression and rarefaction of a gap between the plurality of rectangular patterns in the perimeter directions, or by a combination of different sizes of the plurality of rectangular patterns in the directions of its width. The above-mentioned rectangular pattern can be formed, for example, by the following process.

Because the phase change recording film is formed also on the transition area 113 and the portion of the embossed zone 114A, the rectangular pattern is formed by a phase change in the phase change recording film by irradiation of a laser beam onto the phase change recording film. Namely, it is recording by a laser marking process.

Further, because also the transition area 113 and the portion of the embossed zone 114A are covered with the protection layer, the rectangular pattern can be formed by a printing process on the surface of the above-mentioned protection layer.

Alternatively, if its optical disk is a magneto-optical disk, a reflecting film made of such as aluminum is formed also on the transition area 113 and on the part of the embossed zone 114A. Thereby, the provision of the rectangular pattern is made by partially removing the reflecting film through irradiation of a laser beam. Namely, the recording is done by a laser trimming process.

Still further, the rectangular pattern may be formed on the transition area 113 and the portion of the embossed zone 114A by an embossing processing.

The rectangular pattern formed as described above, because of a difference in reflectance in the portion of the rectangular pattern and in the other portions outside thereof, can to be read out of its information by the pickup of the apparatus.

By the way, it is arbitrary whether to use an entire portion including the transition area 113 and the embossed zone 114A as an area to record the disk cartridge identification information or to use a portion thereof. In the following description of the embodiment of the invention, it is assumed that the disk cartridge identification information is recorded in the transition area 113.

The above-mentioned disk cartridge identification information is also provided on an exposed side of the case 200 so as to be visibly discernible from outside. In this embodiment of the invention, the disk cartridge identification information is attached to an exposed portion of the case 200 (on an external side wall either of the upper shell 210 or the lower shell 280 of the case 200) so as to be discernible from the outside thereof. In FIGS. 5, 6 and 10, numeral 202 denotes each disk cartridge identification information provided on the external side of the case 200.

The disk cartridge identification information to be provided on the case 200 may be any numbers so long as it does not duplicate among a plurality of disk cartridges 1000 owned by the user, and can be easily recognized visually by the user. Thereby, for example, 3 or 4 digit numbers will be sufficient. Therefore, it is considered to be adequate in practice to be able to indicate on the case 200 the lower 3 or 4 digit numbers of the disk cartridge identification information having been recorded in respective optical disks 100.

Namely, supposing that the disk cartridge identification information to be recorded in the transition area 113 of the optical disk 100 is composed of a combination of characters, including alphabetical and numerical letters, of N digits, then the disk cartridge identification information 202 to be indicated on the case 200 may have a combination of characters of M digits including its least significant digit, where M<N.

Then, steps of recording the disk cartridge identification information in the optical disk 100 and on the case 200 will be described in the following.

FIGS. 5A–5E illustrate steps of recording the disk cartridge identification information in the optical disk and on the disk case.

Figure 5A:
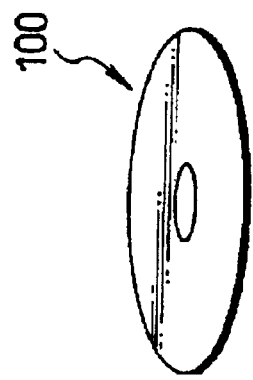
FIGS. 5A–5E show a process flow for recording a disk cartridge ID information on an optical disk and on a disk housing, respectively.
Figure 5B:
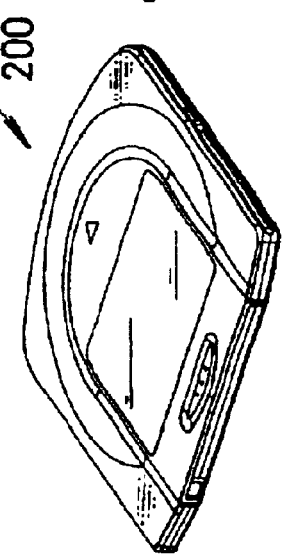

With reference to FIGS. 5A–5B, the optical disk 100 fabricated by the steps of FIGS. 4A–4E is incorporated into the case 200. Namely, these steps correspond to the second step in the disk cartridge manufacturing method of the present invention.

Figure 5C:
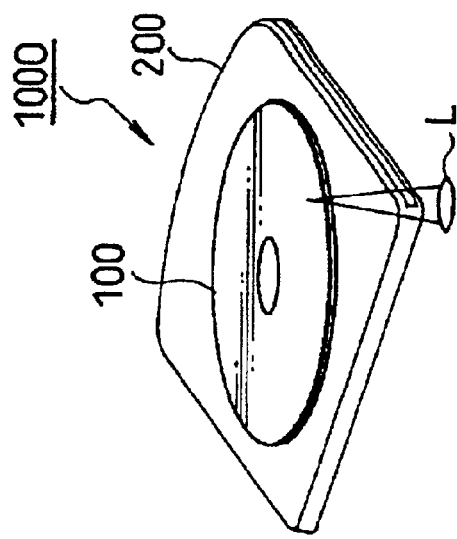

With reference to FIG. 5C, the disk cartridge identification information assigned to the optical disk 100 is recorded in the transition area 113 in the optical disk 100 as a change of phase in the phase change recording film thereof caused, for example, by irradiation of a laser beam from a laser marking device L. Namely, this step corresponds to the third step of the disk cartridge manufacturing method according to the present invention.

Figure 5D:
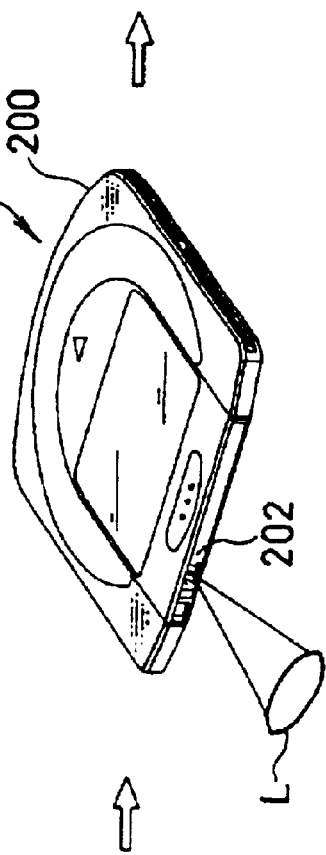

Then, with reference to FIG. 5D, a portion 202 out of the entire disk cartridge identification information including the lowest four digits, for example, "1234" is provided on the external side wall of the case 200, for example, on the external side surface of the upper or the lower shells 210, 280 of the case 200 by irradiation of the laser beam using the laser marking device L. Namely, this process corresponds to the fourth step of the disk cartridge manufacturing method of the present invention. By the way, a method of recording the disk cartridge identification information on the case 200 may include any one of engraving, ultrasonic pen marking, air pen marking, ink jet printing and the like, and can be selected at one's discretion.

Figure 5E:
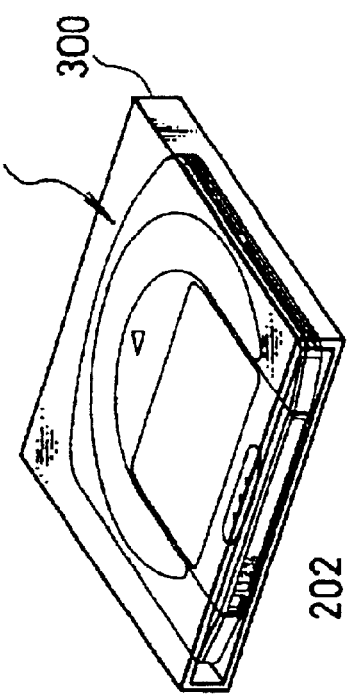

Finally, by accommodating the disk cartridge 1000 into a casing 300 as shown in FIG. 5E, this procedure is accomplished.

It is also possible to provide the disk cartridge identification information 202 on the case 200 according to the following process.

In the first step, before accommodating the optical disk 100 into the case 200, its disk cartridge identification information is recorded thereon using the laser marking or heating process. This step corresponds to the third step of the present invention.

Then, the optical disk 100 is accommodated in the case 200. This step corresponds to the second step of the disk cartridge manufacturing method.

The disk cartridge identification information recorded on the optical disk 100 is read out by the pickup of the apparatus, and its disk cartridge identification information 202 according to what was read out is indicated likewise on a portion of the side wall of the case 200 using the laser marking or any other arbitrary methods described above. This step corresponds to the fourth step of the disk cartridge manufacturing method.

Further, it is also possible to provide the disk cartridge identification information 202 on the case 200 by the following process.

Before incorporating the optical disk 100 into the case 200, its disk cartridge identification information is recorded thereon using the laser marking or heating process. This step corresponds to the third step in the disk cartridge manufacturing method of the invention.

Then, the optical disk 100 is incorporated into the case 200. This corresponds to the second step of the disk cartridge manufacturing method.

Its disk cartridge identification information 202 according to what was read out is indicated on the side wall of the case 200 using the laser marking or any other arbitrary processes described above. This step corresponds to the fourth step of the disk cartridge manufacturing method.

Namely, omitting the step of reading out the disk cartridge identification information from the optical disk 100, it may be arranged such that concurrently when recording the disk cartridge identification information on the optical disk 100, its disk cartridge identification information 202 according to what is recorded may be provided on the case 200 to be visibly discernible from outside thereof.

Recording/Reproducing System

A configuration of the recording/reproducing system of the invention for recording and/or reproducing the above-mentioned disk cartridge 1000 will be described in the following.

FIG. 6 is a schematic diagram illustrating an entire constitution of the recording/reproducing system according to the invention, and FIG. 7 is a schematic block diagram illustrating a configuration of the recording/reproducing system according to the invention.

As shown in FIGS. 6 and 7, the recording/reproducing system 2000 is comprised of a disk cartridge 1000, a recording/reproducing apparatus 2100, a display 2200 and the like.

With reference to FIG. 6, the recording/reproducing apparatus 2100 is comprised of a housing 2110, a power switch 2112 provided on the housing 2110, an operating. circuitry 2114, an insert/eject unit 2116, a receiver circuitry 2118, a display unit 2120 for indicating a state of operation, and a memory unit 2122. The above-mentioned operating portion 2114 is for instructing operations such as a playback, stop, fast forward, rewinding, ejection and the like. The insert/eject unit 2116 is for inserting and/or ejecting the disk cartridge 1000. The receiver circuitry 2118 is for receiving radio signals (or infrared signals) sent from a remote controller 2130. Through the operation of the remote controller 2130, the same operation and function as will be instructed by the operating circuitry 2114 is allowed to be executed.

As indicated in FIG. 7, the recording/reproducing apparatus 2100 is further provided with a CPU 2124, a recording/reproducing circuitry 2126 and a pickup 2128.

The CPU 2124 controls the operating circuitry 2114, the receiver circuitry 2118, the memory unit 2122, the recording/reproducing circuitry 2126 and the pickup 2128.

The recording/reproducing circuitry 2126 has a function to reproduce a signal retrieved via the pickup 2128 from the optical disk 100 in the disk cartridge 1000 and output a signal to be displayed on the display 2200, and also a function to input information via the pickup 2128 to be recorded on the optical disk 100.

The pickup 2128 is for recording and reproducing information by irradiating an optical beam on the optical disk 100. Namely, in accordance with a recording signal entered, it records the information (such as contents, contents identification information and contents index (descriptive) information which will be described later) in the rewritable zone in the information recording area, and also reads out information recorded in the embossed zone and the rewritable zone in the optical disk 100 to be output as a reproducing signal.

Further, the remote controller 2130 and the operating circuitry 2114 are arranged to allow manually inputting contents index (descriptive) information (to be described later). The contents index information having been input, under control of the CPU 2124, is input as a recording signal from the recording/reproducing circuitry 2126 to the pickup 2128 to be controlled and recorded in the rewritable zone in the optical disk.

By way of example, the above-mentioned memory unit 2122 constitutes a memory device of the recording/reproducing system of the present invention. The CPU 2124, the recording/reproducing circuitry 2126 and the pickup 2128 in combination constitute a recording means and a reproducing means of the recording/reproducing system of the present invention. Further, the CPU 2124 constitutes the retrieval (search) device; the operating circuitry 2114, the remote controller 2130 and the receiver circuitry 2118 in combination constitute an operating circuitry, and the display 2200 constitutes a display device of the recording/reproducing system of the present invention.

Now, a function of the recording/reproducing system 2000 described with reference to FIGS. 6 and 7 will be set forth in the following. Here, the description thereof will be made by way of example of an instance where a disk cartridge is loaded for recording and reproducing a television program.

When the disk cartridge 1000 is loaded, under control of the CPU 2124, recording and reproduction of information to and from the optical disk 100 as well as to and from the memory unit 2122 are executed.

Contents, contents identification information and contents index information to be recorded in the optical disk 100 will be set forth in the following.

The contents refer to information of a television program itself, which includes a picture data, audio data, character data and the like to be recorded in the data zone 1142.

The contents identification information is information assigned to each piece of the contents recorded in the data zone 1142, and is assigned at least not to duplicate in a same optical disk. The contents identification information is generated, for example, by the CPU 2124, and is managed and recorded in a portion of the data zone 1142 of the optical disk 100.

The contents index information is data relating to each piece of contents to be recorded in the data zone 1142 in the optical disk 100, which includes, for example, a title of a program, keywords, date and time of broadcasting, a period of time of recording, character data indicating an outline of the program, audio data, picture data (thumb nail) and the like. The contents index information is generated, for example, by manipulation of the operating circuitry 2114 or the remote controller 2130 by the user, and is controlled and recorded in a portion of the data zone 1142 in the optical disk 100.

Further, a format of the contents index information may be predetermined so as to allow an input of data in accordance with this predetermined format.

Here, information to be recorded in the embossed zone 114A in the lead-in zone 1141 and information to be recorded in the lead-out zone 1143 will be described.

As shown in FIGS. 1 and 2, out of the lead-in zone 1141 in the optical disk 100, the embossed zone 114A is used to record unrewritable information such as a general disk information (a type of the disk, line speed, tracking information and the like) and an adjustment signal. Therefore, no attempt to record information on this embossed zone 114A is made from the recording/reproducing apparatus 2100, and operation only to reproduce information therefrom is allowed.

Out of the lead-in zone 1141, a portion corresponding to the rewritable zone 114B is used for calibration of the laser power, or for recording a disk defect management information.

Also in the lead-out zone 1143, lead-out information such as the disk defect management information and the like is recorded.

Now, information to be recorded in the memory unit 2122 in the recording/reproducing apparatus 2100 will be described in the following.

With reference to FIG. 8, there is indicated a table of contents of recording in the memory unit in the recording/reproducing apparatus of the recording/reproducing system according to the present invention.

As shown in FIG. 8, there are recorded in the memory unit 2122 contents identification information CNs (CN1, CN2, CN3, CN4, CN5, . . . ) and contents index (descriptive) information CDs (CD1, DC2, CD3, CD4, CD5, . . . ) according to each of cartridge identification information IDs (ID1, ID2, ID3, . . . ) recorded in the optical disk 100 as correlated therebetween.

Therefore, the CPU 2124 is allowed to execute a search operation to retrieve information stored in the memory unit 2122. For example, it is allowed to retrieve particular contents identification information CN and/or any contents index information CD using its disk cartridge identification information ID as a key. Alternatively, it can retrieve particular disk cartridge identification information ID and/or contents identification information CN using its contents index information CD as a key.

Recording of these cartridge identification information ID, contents identification information CN and contents index information into the memory unit 2122 is carried out when recording the program contents in the disk cartridge 1000 loaded in the recording/reproducing apparatus 2100.

Alternatively, they are recorded while reproducing the program contents already recorded from the disk cartridge 1000 loaded in the recording/reproducing apparatus 2100.

Further, generation of the contents identification information CNs by the CPU 2124 is executed on the basis of a table of the contents of the disk cartridge identification information IDs and the contents identification information CNs stored in the memory unit 2122 so that there occurs no duplication among a plurality of contents identification information CDs corresponding to a same disk cartridge identification information ID.

Further, input and generation of the contents index information CDs by means of the CPU 2124 is done by the user by manipulating the operating circuitry 2114 or the remote controller 2130. Therefore, the contents index information CD according to the embodiment of the invention is comprised of information that can be input via the operating circuitry 2114 or the remote controller 2130 such as a title of the program, a date and hour of broadcasting thereof, a period of time of broadcasting, information indicative of an outline of the program (text data or character string) and the like. By the way, if the recording/reproducing apparatus 2100 is set up to be connectable to the computer, it is possible to record picture information such as a thumb nail and/or audio information in the memory unit 2122 using the computer as the contents index information CD.

By the way, the memory unit 2122 can be comprised of a semiconductor memory, a hard disk or the like. Further, because a memory capacity of the memory unit 2122 is finite, and when the information stored in the memory unit 2122 is saturated, it may be arranged such that older or obsolete information in the stored information is deleted in the order of the oldest so as to ensure for new information to be recorded.

With reference to FIGS. 6 through 8, search operation using the disk cartridge identification information of the disk cartridge 1000, the contents identification information and the contents index information will be described.

As indicated in FIG. 6, it is assumed that there are a plurality of disk cartridges 1000 having program contents already recorded therein. The disk cartridge identification information 202 provided on the case 200 of each disk cartridge 1000 is indicated with the last four digit numbers out of the complete disk cartridge identification information ID as described above. A respective disk cartridge identification information 202 is supposed here to be, for example, "1234", "5678", "0001", "3333", "0111" or "6666".

In the first, a search operation to learn the contents of programs recorded in the disk cartridge 1000 having the disk cartridge identification information 202 of "1234" will be described in the following.

A search operation with respect to the disk cartridge 1000 to learn the contents of data therein using the disk cartridge identification number 202 as a key is instructed by inputting "1234" which appears on the case 200 of the disk cartridge 1000 through the remote controller 2130 or the operating circuitry 2114.

In response to a search instruction received via the receiver circuitry 2118, the CPU 2124 executes a search operation using "1234" of the disk cartridge identification number 202 as a cross-reference key through the memory unit 2122.

Then, a result of its search operation is output on the display 2200. Namely, as shown in FIG. 6, likewise the disk cartridge identification information 202 described above, the disk cartridge identification information 2202 of "1234" which are the lowest four digits out of the disk cartridge identification information ID is displayed, and also the contents identification information CNs: "333", "456", " . . . " is displayed. Then, respective contents index information CDs corresponding to each contents identification information CN such as "Movie "ABC", Oct. 1, 2001", "Japan Baseball Game "G vs. L", Oct. 13, 2000", " . . . " are displayed as a list of contents. In an example of FIG. 6, as the content index information CD, there are contained program titles and the date of start of recording.

Therefore, without the need of actually loading the disk cartridge 1000 into the record/reproduce apparatus 2100, the user is allowed to know the contents index information CD recorded in the disk cartridge 1000.

Further, when the user desires to know what contents are recorded in which disk cartridge 1000, the user proceeds with the search operation as will be described in the following.

In a first step, the user instructs a search operation via the remote controller 2130 or the operating circuitry 2114 using a keyword or any data contained in the contents index information CD as a searching key.

The CPU 2124 executes a keyword searching using the above keyword as a cross-reference key through the memory unit 2122.

Then, a result of its searching is output on the display 2200.

For example, a plurality of disk cartridge identification information 2202 are displayed corresponding to the keywords of one or more than two on the display 2200, and concurrently, contents identification information CNs and the contents index information CDs corresponding to each of the plurality of the disk cartridge identification information 2202 are displayed in a table. In this instance, the disk cartridge identification information displayed on the display 2200 is indicated, for example, in four digits likewise the disk cartridge identification information 202 which is provided on the disk cartridge 1000 to be visibly discernible from outside the case 200.

Thereby, in accordance with the disk cartridge identification information 202 provided to be visibly discernible from outside the case 200, the user can specify a particular disk cartridge 1000 which stores desired program contents.

Namely, the user can learn a specific disk cartridge 1000 which stores the desired content from the disk cartridge identification information 2202 indicated on the display without the need of actually loading every disk cartridges 1000 into the record/reproduce apparatus 2100.

Further, by recording and managing information such as an address of each piece of the contents having been recorded in the data zone 1142 of the optical disk 100 as correlated with the contents identification information CN, the following function using the contents index information can be provided to the record/reproduce apparatus 2100.

For example, while displaying on the display 2200 a particular disk cartridge identification information 2202, contents identification information CNs corresponding thereto and contents index information CDs corresponding thereto, the user enters a specific contents identification information CN the user desires to playback in the CPU 2124, for example, via the operating circuitry 2114.

Then, the disk cartridge 1000 corresponding to the disk cartridge identification information 2202 which is currently on display is loaded into the record/reproduce apparatus 2100.

The CPU 2124 reads out the address of the contents associated with the contents identification information CN designated above in the loaded disk cartridge 1000 from its data zone 1142 in which addresses are coordinated and controlled centrally, then controls the pickup 2128 and the recording/reproducing circuitry 2126 to execute a playback operation of the contents.

Further, if a recording time of recorded contents is contained in the contents index information CD, it is also possible to allow for the CPU 2124 to compute a recordable time remaining by subtracting a sum of recorded time of respective contents from a total time of available recording zone in the optical disk 100 and indicate it on the display 2120 of the recording/reproducing apparatus 2100.

Still further, it is also possible to compare a remaining time available for recording and a time needed for recording a new content, then to select an appropriate cassette capable of recording the new content.

Still more, it is also possible to arrange for a quality of recording to be adjusted such that all of the contents may be recorded on the disk cartridge selected.

By way of example, the contents identification information CNs and the contents index information CDs are described to have been generated and entered by the user via the operating circuitry 2114 or the remote controller 2130, however, they may be generated also using added-information which is broadcast together with the program.

Further, in the case of making a copy of program contents on a disk cartridge from a commercially available software or from a recorded video cassette, it is also possible to generate a contents identification information CN and a contents index information CD using added information recorded in these software and video cassette.

This added information will be described in the following.

FIG. 9 is a table listing added information recorded in the broadcast contents, commercial software, and photographed videocassettes.

An example of recording broadcast contents on a disk cartridge 1000 will be described.

In the cases of BS digital broadcasting, CS digital broadcasting, ground wave digital broadcasting and the like, Electric Program Guide (EPG) information (i.e., electronic program information) is added to their contents as added-information. In this EPG, contents ID which is uniquely assigned to this broadcast program and contents data descriptive of the contents of the program are contained. This contents data (descriptive of the contents) includes information on a program title, a broadcasting hour, a broadcasting period of time and the like.

By the way, in FIG. 9, the contents data (descriptive of the contents) includes already setup information and other additional information to be added by the user. The additional information is information which can be additionally generated by the user.

Therefore, it is possible to utilize the above-mentioned contents ID as the contents identification information CN, and the above-mentioned contents data as the contents index information CD.

Further, in such a case where there is no added information corresponding to the above-mentioned EPG as in the analog ground wave broadcasting, it is necessary to generate its contents identification information CN in the recording/reproducing apparatus 2100, and enter its contents index information CD via the operating circuitry 2114 or the remote controller 2130.

An example of recording commercial software on a disk cartridge 1000 will be described in the following.

As for a commercial software (sold with a copyright) in which added information including contents ID and contents data (index) likewise the EPG described above are contained, it is possible to record a contents identification information CN and a contents index information CD using these contents ID and contents information on the disk cartridge 1000 likewise the case of the above-mentioned BS digital broadcasting.

Further, as for a commercial software with no added information recorded (for example, a commercial video tape), it is necessary to generate the contents identification CN in the recording/reproducing apparatus 2100, and to enter the contents index information CD via the operating circuitry 2114 or the remote controller 2130.

In the next, an instance of recording on a disk cartridge 1000 of contents having been recorded using a digital video recorder (DV), or of contents having been edited by the user will be described.

In these cases, because no added information is recorded corresponding to the above-mentioned EPG, it is necessary to generate its contents identification information CN in the recording/reproducing apparatus 2100, and to enter its contents data information CD via the operating circuitry 2114 or the remote controller 2130.

According to the embodiment of the invention described above, not only the disk cartridge identification information ID is recorded in the optical disk 100, but also the disk cartridge identification information 202 is provided on the case 200 of the disk cartridge 1000 so as to be visibly recognizable from outside thereof.

However, it is not limited thereto, and as it will be described in the following, in addition to the disk cartridge identification information 202 provided on the case 200, another disk cartridge identification information of a different type or mode differing from the above may be recorded on the disk cartridge 1000.

Figure 10B:
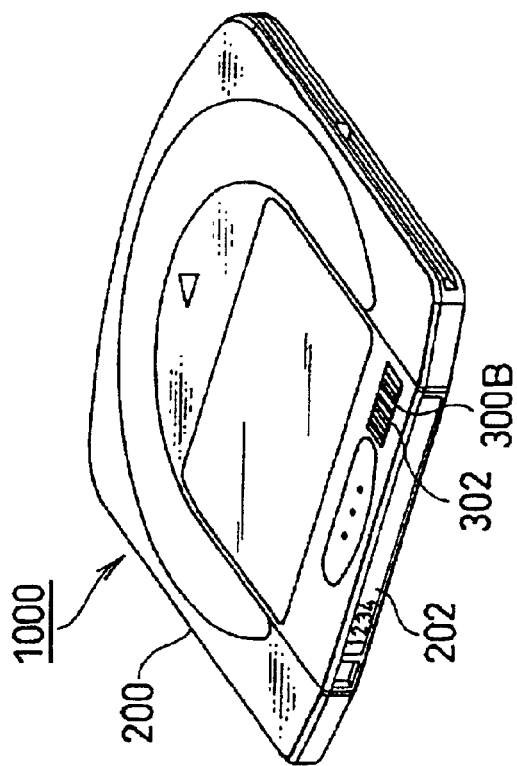
Figure 10A:
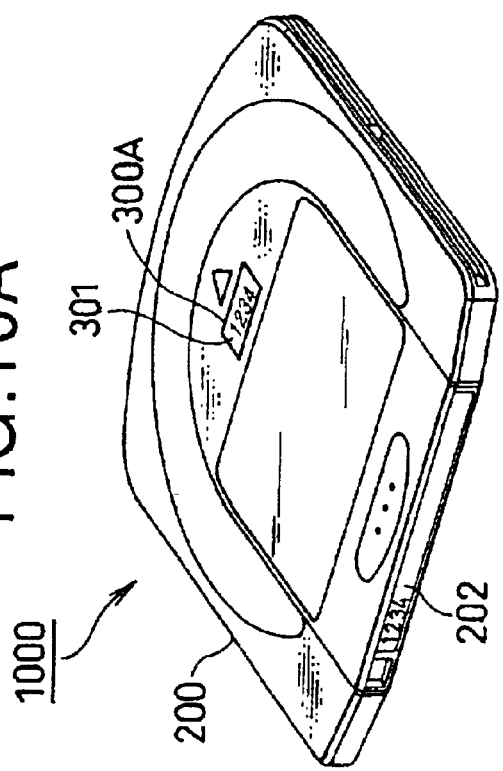
Figure 10C:
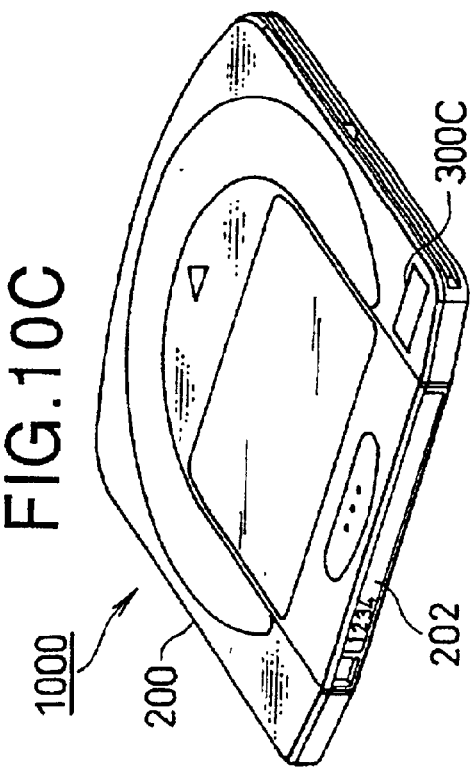

FIGS. 10A–10C show various examples of recording the disk cartridge identification information on respective disk cartridges according to the presents invention. FIG. 10A is a perspective view of an example of recording by use of a seal, FIG. 10B is a perspective view of another example using a bar code label, and FIG. 10C is a perspective view of still another example of recording by use of a memory.

Namely, it can be arranged such that, as shown in FIG. 10A, a disk cartridge identification information 301 similar to the disk cartridge identification information 202 provided on the case 200 is printed on a seal 300A, and is pasted on the case 200, for example, at a position on an external surface of its upper shell 210 during manufacturing of the disk cartridge 1000.

In this case, therefore, it is allowed to recognize its disk cartridge identification information also from another viewing angle other than the side wall portion of the case 200.

As shown in FIG. 10B, it can be arranged such that, as shown in FIG. 10B, the disk cartridge identification information ID recorded in the optical disk 100 in the disk cartridge 1000 is printed as a disk cartridge identification information 302 on a bar code label 300B, and which is pasted at an external position, for example, on its upper shell 210 of the case 200 to be visibly discernible from the outside thereof during manufacturing of the disk cartridge 1000. In this case, a bar code reader can be provided to the recording/reproducing apparatus 2100 or to the remote controller 2130, otherwise, a dedicated bar code reader may be provided separately such that this bar code reader reads out the disk cartridge identification information 302 from the above-mentioned bar code label 300B. In this case, without the need of reproducing the optical disk 100 using the pickup, the disk cartridge identification information 302 can be read out directly from the bar code label 300B.

As shown in FIG. 10C, a memory 300C being an auxiliary memory unit of the present invention which stores the disk cartridge identification information ID recorded in the optical disk 100 packaged in the disk cartridge 1000 may be provided, for example, on the upper shell 210 of the case 200 in the process of manufacture of the disk cartridge 1000.

In this case, a memory reader capable of reading recorded information may be provided to the recording/reproducing apparatus 2100 for reading the disk cartridge identification information ID from this memory 300C. In this instance, without the need of reproducing the optical disk 100 via the pickup, the disk cartridge identification information can be read out directly from the memory 300C.

The above-mentioned memory 300C may be either of a so-called contacting type with an exposed contact terminal, or a so-called non-contacting type with a non-exposed contact terminal.

In the above description of the preferred embodiments of the invention, although it is set forth that the disk cartridge identification information 202 is provided on the external surface of the case 200, however, it is not limited thereto, and the disk cartridge identification information 202 may be provided anywhere so long as it is visibly recognizable from the outside of the case 200. It may be arranged, therefore, freely with one's discretion according to the invention, for example, such that the disk cartridge identification information is provided inside the case 200 and also an opening which allows this disk cartridge identification information to be exposed to the outside is provided thereby allowing for this disk cartridge identification information to be visible through this opening from outside the case 200.

Still further, in the above description of the preferred embodiments of the invention, the phase change type optical disk is referred to as the optical disk used, however, it is not limited thereto, and any other one such as a magneto-optical disk used in an MD, and an organic dye change type disk used in a CD-R may be used as well.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. A disk cartridge having a disk and a case for housing said disk, said disk comprising:
    a center hole provided in a center thereof;
    a disk holder area which is annular and extends outwardly from said center hole;
    a transition area which is annular and extends outwardly from said disk holder area, said transition area not for use of recording information; and
    an information recording area which is annular and extends outwardly from said transition area, said information recording area for use of recording information, wherein:
    said information recording area comprises:
        a first annular zone for recording information unrewritably, residing on an inner side in radial directions of said disk; and
        a second annular zone for recording information rewritably, residing outwardly from said first annular zone in the radial directions, and
    said transition area and said first annular zone constitutes a third annular zone; and
    a disk cartridge identification information which is uniquely assigned to said disk is recorded in a portion of said third annular zone, and is provided to be visibly discernible from outside said case.

2. The disk cartridge as claimed in claim 1, wherein a type of recording of said disk cartridge identification information in said third annular zone is different from a type of recording information in said information recording area.

3. The disk cartridge as claimed in claim 1, wherein:
    a lead-in zone capable of recording lead-in information is defined to include said first annular zone and a portion of said second zone adjacent to said first annular zone on an inner side in the radial directions of the disk, and
    a remaining zone except for said lead-in zone in said second annular zone comprises a data zone capable of recording contents information and a lead-out zone capable of recording lead-out information.

4. The disk cartridge as claimed in claim 3, wherein a contents identification information which is assigned to each piece of contents recorded in said data zone for identification thereof and a contents index information descriptive of the contents recorded in said data zone are recorded in said data zone.

5. The disk cartridge as claimed in claim 1, wherein recording of said disk cartridge identification information in said third annular zone is performed by forming a plurality of rectangular patterns each having a length in radial directions of an optical disk and a width in circumferential directions thereof, spaced apart from each other in the circumferential directions.

6. The disk cartridge as claimed in claim 1, wherein said disk cartridge identification information is expressed by a combination of compression and rarefaction of a gap between said plurality of rectangular patterns in said circumferential directions.

7. The disk cartridge as claimed in claim 1, wherein said disk cartridge identification information is expressed by a combination of sizes in width directions of said plurality of rectangular patterns.

8. The disk cartridge as claimed in claim 5, wherein said plurality of rectangular patterns are formed by any one of a laser marking and a laser trimming processes.

9. The disk cartridge as claimed in claim 5, wherein:
    a phase change recording film is provided in said third annular zone of said disk, and
    said plurality of rectangular patterns are formed by a laser beam irradiation on said phase change recording film so as to cause a phase change in said phase change recording film.

10. The disk cartridge as claimed in claim 5, wherein said plurality of rectangular patterns are formed by a molding process.

11. The disk cartridge as claimed in claim 1, wherein said disk cartridge identification information is recorded to be optically reproducible.

12. The disk cartridge as claimed in claim 1, wherein said disk cartridge identification information is recorded to be reproducible by a pickup which optically reproduces information recorded in said information recording area.

13. The disk cartridge as claimed in claim 1, wherein said disk cartridge identification information comprises a combination of characters.

14. The disk cartridge as claimed in claim 13, wherein said characters contain at least either one of numerals and alphabetic characters.

15. The disk cartridge as claimed in claim 1, further comprising an auxiliary memory provided on said disk cartridge for storing said disk cartridge identification information, said auxiliary memory arranged to allow for its disk cartridge identification information to be read with either one of a contacting pickup and a noncontacting pickup.

16. The disk cartridge as claimed in claim 1, wherein a bar code seal indicating said disk cartridge identification information is pasted on said disk cartridge.

17. The disk cartridge as claimed in claim 1, wherein a seal having said disk cartridge identification information formed visibly is pasted on said disk cartridge.

18. The disk cartridge as claimed in claim 1, wherein said disk cartridge identification information which is recorded in a portion of said third annular zone comprises a combination of characters of N digits, while said disk cartridge identification information which is provided visibly from outside of said case comprises a combination of characters of M digits, where M<N, and being lower M digits including a last one digit in the N digits.

19. A method of manufacturing a disk cartridge having a disk having an information recording area formed for recording information and a case for housing said disk, said method comprising:
    a first step of forming:
        a disk holder area which extends annularly and outwardly from a center hole provided in a center of said disk;
        a transition area which extends annularly and outwardly from said disk holder area, not for use of recording information; and
        an information recording area for recording information which extends annularly and outwardly from said transition area, said information recording area comprising:
            a first annular zone for recording information unrewritably, residing on an inner side in radial directions of said disk; and a second annular zone for recording information rewritably, residing on an outer side in the radial directions from said first annular zone;

a second step of incorporating said disk which is manufactured in said first step into the case;

a third step of recording a disk cartridge identification information assigned uniquely to said disk into a third annular zone which includes said transition area and said first annular zone; and a fourth step of providing said disk cartridge identification information to be visible from outside said case.

20. The method of manufacturing a disk cartridge as claimed in claim 19, wherein said third step of recording said disk cartridge identification information in said third annular zone is executed in a different method of recording from a method of recording of information in said information recording area.

21. The method of manufacturing a disk cartridge as claimed in claim 19, wherein, in said first step, said first annular zone and the portion of said second annular zone residing on the inner side in the radial directions and adjacent to said first annular zone are formed as a lead-in zone which is capable of recording lead-in information, and a remaining zone of said second annular zone excepting said lead-in zone is formed as a data zone capable of recording contents information and as a lead-out zone capable of recording lead-out information.

22. The method of manufacturing a disk cartridge as claimed in claim 19, wherein said third step of recording said disk cartridge identification information in said third annular zone comprises forming a plurality of rectangular patterns, each having a length in radial directions of said optical disk and a width in circumferential directions thereof, spaced apart therebetween in the circumferential directions.

23. The method of manufacturing a disk cartridge as claimed in claim 22, wherein said disk cartridge identification information recorded in said third step is expressed by a combination of compression and rarefaction in a gap between said plurality of rectangular patterns in said circumferential directions.

24. The method of manufacturing a disk cartridge as claimed in claim 22, wherein said disk cartridge identification information recorded in said third step is expressed by a combination of different sizes in width directions of said plurality of rectangular patterns.

25. The method of manufacturing a disk cartridge as claimed in claim 22, wherein said third step of forming said plurality of rectangular patterns is executed by a laser marking process.

26. The method of manufacturing a disk cartridge as claimed in claim 22, wherein said third step of forming said plurality of rectangular patterns is executed by a molding process.

27. The method of manufacturing a disk cartridge as claimed in claim 22, wherein:

a phase change recording film is provided on said third annular zone of said disk, and said third step of forming said plurality of rectangular patterns is executed by irradiation of a laser beam on said phase change recording film so as to cause a phase change in said phase change recording film.

28. The method of manufacturing a disk cartridge as claimed in claim 19, wherein said disk cartridge identification information recorded in said third step is recorded in a form which is optically reproducible.

29. The method of manufacturing a disk cartridge as claimed in claim 19, wherein said disk cartridge identification information recorded in said third step is recorded in a form which is reproducible by a pickup which optically reproduces information recorded in said information recording area.

30. The method of manufacturing a disk cartridge as claimed in claim 19, wherein said disk cartridge identification information recorded in said third step comprises a combination of characters.

31. The method of manufacturing a disk cartridge as claimed in claim 30, wherein said combination of characters comprises at least one of numerical and alphabetic characters.

32. The method of manufacturing a disk cartridge as claimed in claim 19, wherein said disk cartridge identification information recorded in a portion of said third annular zone in said third step comprises a combination of characters of N digits while the disk cartridge identification information provided visibly from outside said case in said fourth step comprises a combination of characters of M digits which correspond to lower M digits including a last one digit in said N digits, wherein M<N.

33. A recording/reproducing system having a disk cartridge and a recording/reproducing apparatus, wherein:

said disk cartridge includes:

a disk capable of recording/reproducing information and a case for accommodating said disk, wherein:

said disk records a disk cartridge identification information which is uniquely assigned to said disk, and said disk cartridge identification information is provided visibly on said case, and said recording/reproducing apparatus comprises:

recording means for recording contents of information, contents identification information which is assigned uniquely to each of said contents and a contents index information descriptive of said contents on a disk in said disk cartridge which is loaded in said recording/reproducing apparatus;

reproducing means for reproducing said disk cartridge identification information, said contents, said contents identification information and said contents index information which are recorded in said disk;

a memory for storing said disk cartridge identification information, said contents identification information and said contents index information which are reproduced by said reproducing means, as correlated therebetween; and retrieval means for retrieving information via said disk cartridge identification information, said contents identification information and/or said contents index information which are recorded in said memory.

34. The recording/reproducing system as claimed in claim 33, wherein:

said disk has:

a center hole provided in the center thereof;

a disk holder area which extends annularly and radially from said center hole;

a transition area which extends annularly and radially from said disk holder area, said transition area not for use of recording information; and an information recording area which extends annularly and radially from said transition area for recording information, wherein:

said information recording area comprises a first annular zone which exists on an inner side in radial directions of the disk for recording information unrewritably, and a second annular zone which exists on an outer side in radial directions thereof for recording information rewritably, and a third annular zone which comprises said transition area and said first annular zone is set up for recording said disk cartridge identification information in a portion of said third annular zone.

35. The recording/reproducing system as claimed in claim 33, wherein a type of recording of said disk cartridge identification information in said third annular zone is different from a type of recording of information in said information recording area.

36. The recording/reproducing system as claimed in claim 33, wherein:

a lead-in zone capable of recording a lead-in information is provided in said first zone and a portion of said second annular zone residing on an inner side in radial directions of the disk, adjacent to said first annular zone, and a remaining portion of said second annular zone excepting said lead-in zone comprises a data zone capable of recording contents information and a lead-out zone capable of recording a lead-out information.

37. The recording/reproducing system as claimed in claim 33, wherein said contents identification information and said contents index information are recorded in a portion of said second annular zone corresponding to said third annular zone.

38. The recording/reproducing system as claimed in claim 33, wherein said retrieval of information using said retrieval means comprises searching said contents identification information and said contents index information using said disk cartridge identification information as a key.

39. The recording/reproducing system as claimed in claim 33, wherein said retrieval of information using said retrieval means comprises searching said disk cartridge identification information using said contents index information as a key.

40. The recording/reproducing system as claimed in claim 33, further comprising a display for displaying information retrieved by said retrieval means.

41. The recording/reproducing system as claimed in claim 33, further comprising information generating means for generating said contents identification information and said contents index information, wherein said recording means comprises recording said contents identification information and said contents index information which are output from said information generating means on said disk.

42. The recording/reproducing system as claimed in claim 41, wherein said information generating means comprises operating means for manually inputting information, and wherein generation of said contents index information by said information generating means is enabled by operation of said operating means.

43. The recording/reproducing system as claimed in claim 42, wherein said contents comprises added information which contains at least one of a contents ID for identifying said contents and a contents index information descriptive of said contents, and wherein said information generating means carries out generating at least either one of said contents identification information in accordance with said contents ID and said contents index information in accordance with said contents of the added information.

44. The recording/reproducing system as claimed in claim 43, wherein:

said contents comprises a broadcasting program which is broadcast in a BS digital, a CS digital, or a ground wave digital broadcasting, and said added information comprises electronic program information broadcast corresponding to said broadcast program.

45. The recording/reproducing system as claimed in claim 33, wherein:

said contents are broadcast programs, and said contents index information contains descriptive information at least one of a program title, a broadcasting hour, an outline of the program and a keyword descriptive of said broadcast program.

46. The recording/reproducing system as claimed in claim 33, wherein said contents index information includes information of a type at least of characters, images and voice.

* * * * *